C. W. FORBES.
DIRECTION INDICATOR FOR AUTOVEHICLES.
APPLICATION FILED APR. 9, 1918.
1,296,065.  Patented Mar. 4, 1919.
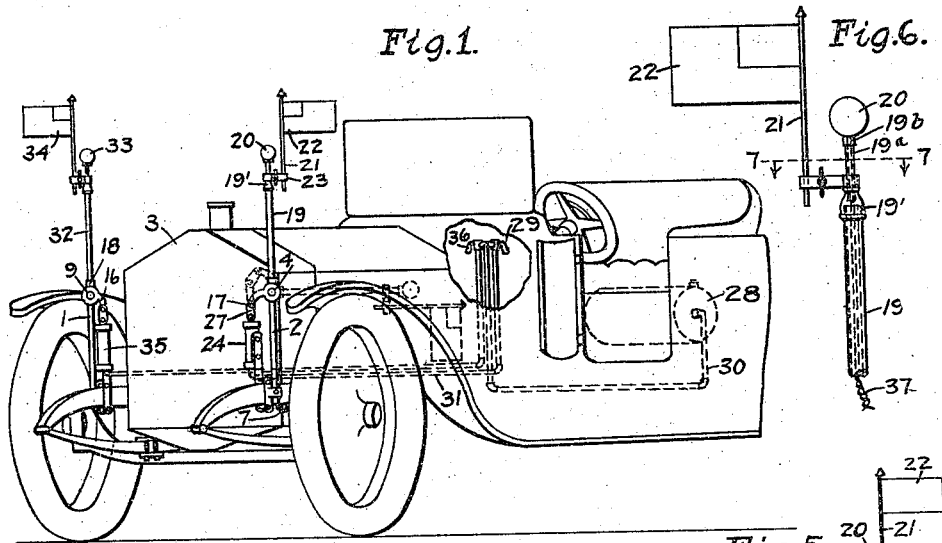
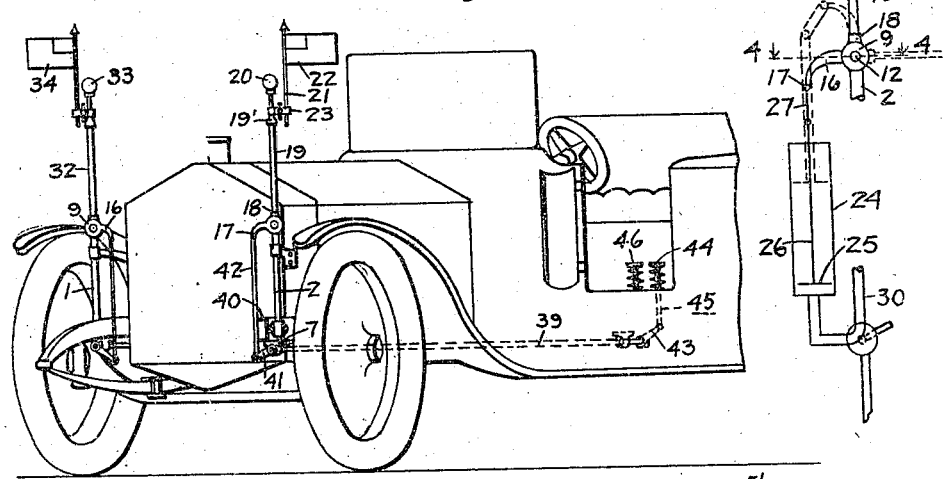
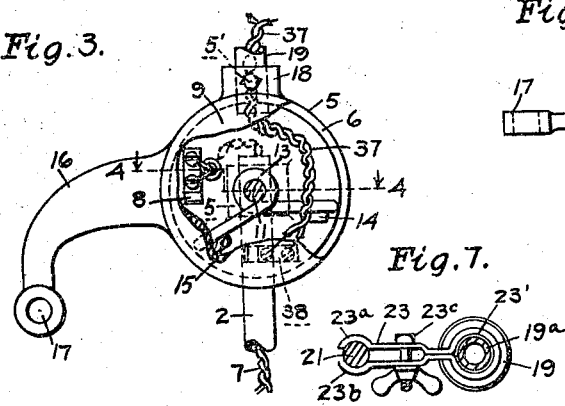
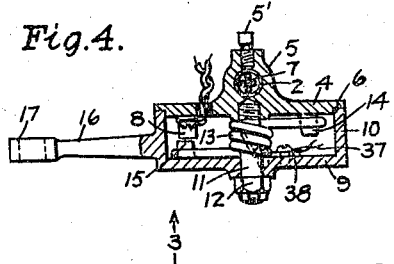
Inventor:
Charles W. Forbes,
by Hazard & Miller
Att'ys.

UNITED STATES PATENT OFFICE.

CHARLES W. FORBES, OF PASADENA, CALIFORNIA.

DIRECTION-INDICATOR FOR AUTOVEHICLES.

1,296,065.   Specification of Letters Patent.   Patented Mar. 4, 1919.

Application filed April 9, 1918. Serial No. 227,585.

*To all whom it may concern:*

Be it known that I, CHARLES W. FORBES, a citizen of the United States, residing at Pasadena, in the county of Los Angeles and State of California, have invented new and useful Improvements in Direction-Indicators for Autovehicles, of which the following is a specification.

My invention relates to direction indicators for motor vehicles and consists of the novel features herein shown, described and claimed.

Figure 1 is a perspective of the front end of an automobile provided with direction indicators embodying the principles of my invention.

Fig. 2 is a view analogous to Fig. 1, and showing a modified construction.

Fig. 3 is a fragmentary detail of one of the joints and showing the circuit breaker.

Fig. 4 is a horizontal section on the line 4—4 of Figs. 1, 3 and 5.

Fig. 5 is a diagrammatic view of the compressed air system shown in Fig. 1.

Fig. 6 is an enlarged detail elevation of an indicating arm and flagstaff holder.

Fig. 7 is a horizontal section on the line 7—7 of Fig. 6.

The posts 1 and 2 are rigidly mounted at points outwardly and forwardly of the front corners of the radiator 3, the lower ends of the posts being clamped to the frame and the upper ends of the posts being bracketed to the radiator. At the upper end of the post 2 is a flat bearing plate 4. A boss 5 extends backwardly from the plate 4 and is slidingly mounted upon the post 2 and held in adjusted position by set screw 5'.

The plate 4 is in line crosswise of the line of travel and has a bearing face 6 on its front side. The electric cable 7 passes upwardly through the hollow in the post 2; said post being a pipe and the cable passing from the upper end of the post through an opening in the plate 4 to a spring contact 8 secured upon the front face of the plate 4.

A bearing plate 9 has an annular flange 10 fitting the annular bearing seat 6 of the plate 4 and a stud 11 is screwed into the plate 4 at its axial center and extends through the center of the bearing plate 9, and a nut 12 is placed upon the stud to hold the plates together. A helical spring 13 is placed upon the stud 11 between the plates 4 and 9, one end of the spring engaging a boss 14 upon the plate 4 and the other end engaging the boss 15 upon the plate 9.

A crank arm 16 extends from the plate 9 inwardly and downwardly and has a bearing 17 in its inner end.

The socket 18 extends upwardly from the plate 9, the pipe indicator arm 19 is screwed into the socket 18, a reducer 19' is screwed upon the upper end of the pipe 19, and a nipple 19ª is screwed into the reducer. The lamp 20 has a socket 19ᵇ screwed upon the nipple 19ª. A flagstaff 21 carrying the flag 22 is mounted between the jaws of the clamp 23. The clamp 23 is a strap bent upon itself to form the bearing 23' loosely encircling the nipple 19ª and forming the jaws 23ª and 23ᵇ for gripping the flagstaff 21.

A bolt and wing nut 23ᶜ is inserted through the arms of the clamp between the nipple 19ª and the flagstaff 21, so that by manipulating the wing nut, the flagstaff may be raised or lowered and rigidly clamped in adjusted position and at the same time the flagstaff is free to revolve around the nipple 19ª.

The tension of the spring 13 is exerted to hold the indicator arm 19, the lamp 20 and the flag 22 upright. A piston cylinder 24 is mounted beside the post 2, a piston 25 slides in the cylinder 24, and the piston rod 26 is connected to the bearing 17 by a link 27.

The air tank 28 is mounted under the seat. The control valve 29 is mounted upon the instrument board. The pipe 30 leads from the air tank to the control valve 29 and the pipe 31 leads from the control valve 29 to the cylinder 24, so that when the control valve 29 is operated one way, the air passage is opened from the tank 28 to the cylinder 24 and the pressure of the air will raise the piston 25, overcome the tension of the spring 13 and throw the arm 19, the lamp 20 and the flag 22 outwardly to a horizontal position, as shown in dotted lines in Figs. 1 and 5. This will indicate that the driver of the machine intends to turn to his left, and when the control valve 29 is operated the other way, the air pressure from the cylinder will be exhausted to allow the spring 13 to return the indicator to vertical and normal positions. In a like manner the indicating arm 32, the lamp 33 and the flag 34 are mounted upon the post 1 and operated by the cylinder 35 piped to the tank 28 through the control valve 36.

The wires 37 extend downwardly from the lamp 20 through the post 19, said post being of pipe, and the lower ends of the wires extend across the inner face of the plate 9 and are attached to the spring contact 38, so that when the arm 19 swings to horizontal position the contact 38 will engage the contact 8 and light the lamp.

The lamp 33 is operated in a similar manner.

In the modified construction shown in Fig. 2 a rock shaft 39 is mounted under the side bar 40, a crank arm 41 connects the forward arm of the rock shaft to the link 42 and the upper end of the link 42 is connected to the bearing 17 upon the arm 16. A crank arm 43 is connected to the rear end of the rock shaft 39 and extends in the opposite direction from the crank arm 41, and a pedal 44 is connected to the outer end of the crank arm 43, the stem 45 of the pedal extending through the bottom board in front of the operator, so that by pressing downwardly on the pedal 44 the indicating arm 19, the lamp 20 and the flag 22 will be swung outwardly, the same as by operating the compressed air system in Fig. 1.

In a like manner the pedal 46 controls the indicating arm 32, the lamp 33 and the flag 34.

The studs 11 are pivots rigidly mounted. The plates 9 are bearings mounted upon the pivots. The arms 16 and bearings 17 constitute operating arms. The indicator arms 19 and 32 are fixed to the pivoted bearings at right angles to the operating arms and the lamps 20 and 33 and the flags 22 and 34 are indicators mounted upon the indicating arms.

In Fig. 1, I have shown compressed air means for moving the operating arms upwardly to swing the indicating arms and indicators outwardly.

The springs 13 constitute means for holding the indicating arms and indicators upright, and in Fig. 2 I have shown mechanical means for moving the operating arms upwardly to swing the indicating arms and indicators outwardly.

If desired, the means for operating the indicators may be controlled from the steering post.

Various changes may be made in the construction, combination and arrangement of parts without departing from the spirit of my invention as claimed.

I claim:

In a direction indicator, a post adapted to be mounted outwardly and forwardly of the front corner of a radiator, a clamp for securing the lower end of the post, a bracket for securing the upper end of the post, a bearing plate secured to the upper end of the post, a second bearing plate pivotally connected to the first bearing plate, a crank arm extending from the second bearing plate inwardly and downwardly, a socket extending upwardly from the second bearing plate, an indicator arm fixed in the socket, an indicator secured to the indicator arm, and means for operating the crank arm to swing the indicator arm from a vertical position outwardly and backwardly.

In testimony whereof I have signed my name to this specification.

CHARLES W. FORBES.